UNITED STATES PATENT OFFICE.

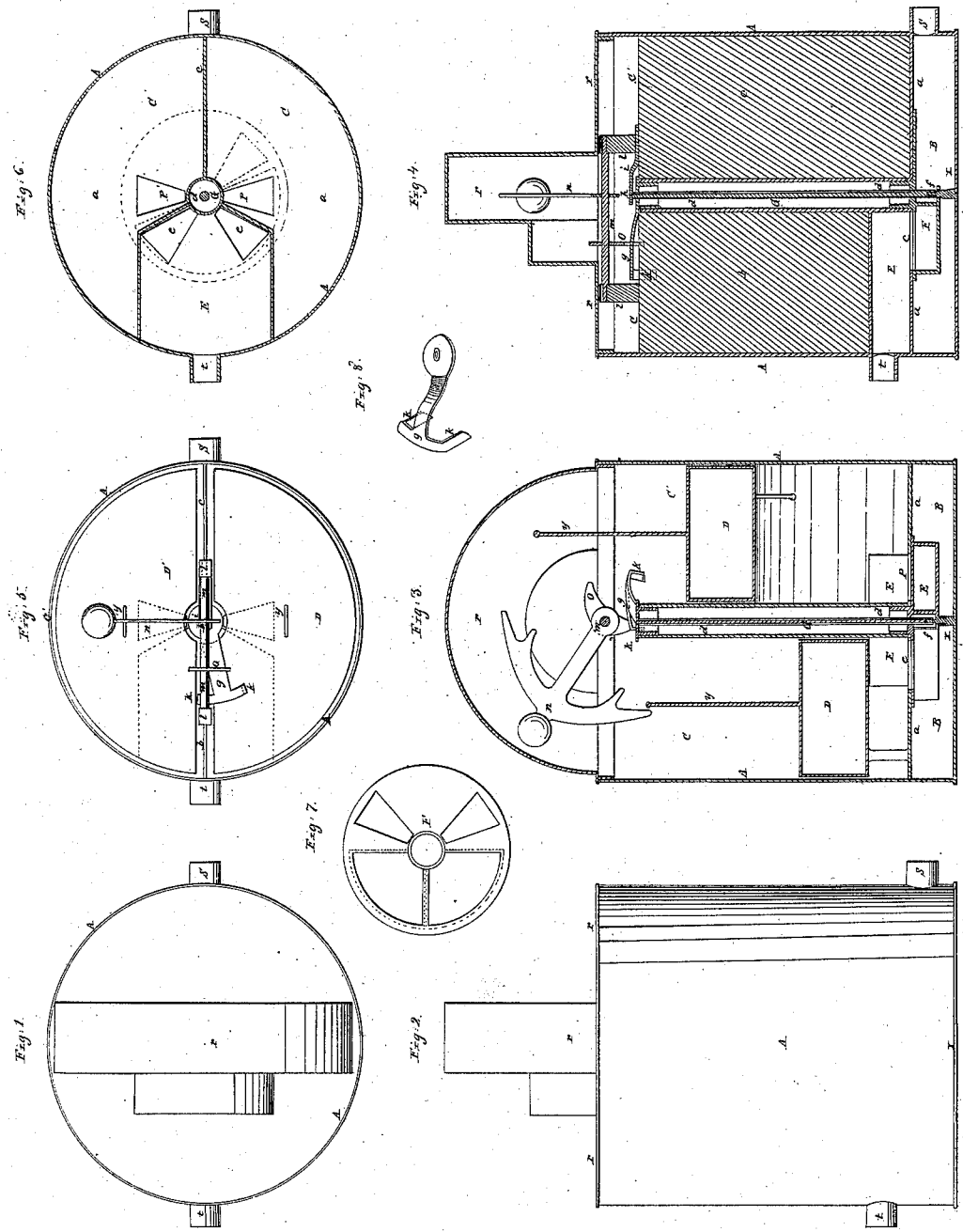

J. S. SHAILER AND G. F. FOLSOM, OF ROXBURY, MASSACHUSETTS.

WATER-METER.

Specification of Letters Patent No. 31,830, dated March 26, 1861.

*To all whom it may concern:*

Be it known that we, JULIUS S. SHAILER and GEORGE F. FOLSOM, of Roxbury, in the county of Norfolk and State of Massachusetts, have invented a new and useful or Improved Water-Meter, and do hereby declare the same to be fully described in the following specification and illustrated in the accompanying drawings, of which—

Figure 1, is a top view; Fig. 2, a side elevation, and Figs. 3, and 4, sections of it, Fig. 3, being taken in the plane of the valve tripper, while Fig. 4, is taken in a plane at right angles to such tripper. Fig. 5, is a top view of the meter as it appears when its cover is off its case. Fig. 6, is a transverse section taken through the valve ports. Fig. 7, is a top view of the chambered valve.

In the drawings, A, exhibits a cylindrical vessel or case, which by means of three partitions, $a$, $b$, $c$, and a tube, $d$, is divided into three chambers B, C, C'. The partition, $a$, is arranged parallel to the bottom, $x$, of the case and at a short distance above it. The tube, $d$, is elevated perpendicularly on the central part of the partition, $a$, while the partitions, $b$, $c$, extend from the said tube in opposite directions and to the opposite sides of the case A, the whole being as shown in the drawings.

The chamber, B, is what we term the induction chamber, the chambers, C, C' being the float chambers. Each of the latter chambers, C, C', receives a semicircular or other proper shaped float, D, or D', provided with a stem or projection, $y$. Furthermore, there is another or eduction chamber, E, which is formed on the partition, $a$, and wholly on one side of the tube, $d$, in manner as shown in the drawings. This eduction chamber is furnished with one or more entrance ports, $c$, formed through its bottom and so as to open communication between such chamber, E, and the internal space or chamber of a valve, F. This valve, F, is arranged within the chamber, B, and affixed to an upright shaft or stem, G, which is stepped on a screw or pivot, $f$, and extends longitudinally through the tube, $d$. A lever or arm, $g$, caps the upper end of the said tube, $d$, and projects from the shaft, G, which has another pivot, $h$, arranged at its upper end, such pivot, $h$, being supported by a bracket, $i$, projected from the partition, $c$. The arm, $g$, terminates in a fork or two bent projections or stops, $k$, $k$, the same being as exhibited in Fig. 8, which is a perspective view of the said arm and its fork, the latter being arranged so as to straddle the upper part of the partition $b$.

Two standards, $l$, $l$, rise from the two partitions, $b$, $c$, and support a rocker shaft, $m$. A weighted valve tripper, $n$, formed as shown in Figs. 3, and 4, projects from the shaft, $m$, which also supports an auxiliary tripper, $o$, that is placed over the arm, $g$, and projects in opposite directions from the shaft.

Each of the float chambers, C, C' has a port, $p$ or $p'$, leading through its bottom, these ports being arranged with respect to the tube, $d$, as shown in Figs. 3, 5, and 6. The cap or cover, $r$, of the case should fit the case, air tight, and may be formed as shown in the drawings.

The water or liquid to be measured is led (under pressure) into the induction chamber, B, by a conduit, S, a similar conduit, $t$, serving to discharge liquid from the eduction chamber, E. The chambered valve, F, is so arranged, on its shaft, and with respect to the two ports, $p$, $p'$ that while either of the said ports may be opening communication between the induction chamber and one of the float chambers, it, (the said valve) or its chamber shall open communication between the other float chamber and the eduction chamber, all communication between the latter chamber and the first float chamber being cut off by the valve. Under these circumstances, if water under pressure, be allowed to rush into the induction chamber, it will pass from thence into the first float chamber, and while rising therein, will elevate its float until the stem thereof, by being forced against the tripper, $n$, shall press the said tripper upward far enough for the action of gravity to cause such tripper to fall over toward the other float. During such fall, the auxiliary tripper will be caused to so act against and move the arm $g$, as to produce such a sudden movement of the valve as will not only open communication between the eduction chamber and the filled float chamber and close communication between the education chamber and the other, or empty float chamber, but open communication between the latter chamber and the induction chamber. This having been accomplished, the water will flow into the empty float chamber, and as the two float chambers open into each other above their dividing partitions, the entering water by pressing against the air between it and the water of the filled chamber, will produce the expulsion of water from the said filled chamber such water being caused to pass into the valve and from thence into the eduction chamber out of which it will escape by the discharging conduit of the latter. While the water may be rising in the float chamber it will be raising the float of such chamber, and will cause such float to elevate the tripper, $n$, into such position as to again cause gravity to act and produce another or counter movement of the valve, whereby the water may next be introduced into the empty float chamber and effect the expulsion of that of the last filled float chamber. The above described operations will be continually repeated so long as the water may be suffered to flow through the meter.

The water on being discharged from the meter does not have its pressure materially diminished, because the air within the two chambers C, C′, is alternately moved from one chamber into the other, and operates as a spring to maintain the initial pressure of the water. Thus, in our improved meter the air is made to perform a very important function.

A counter or apparatus to indicate the number of movements or oscillations of the tripper may be applied to the case of the meter, the tripper during each of its movements being caused to so act against a pin or some other part of the counter as to effect such movements of the train of wheels of the counter as may suffice to produce the required registry of the number of times, during any given period that the float chambers may have been filled and emptied.

We claim—

The above described arrangement of the induction chamber, B, the two float chambers, C, C′, the eduction chamber, E, the chambered valve, F, and its ports, the two floats, D, D′, and the valve tripping apparatus, the whole operating together in manner and under circumstances substantially as specified.

JULIUS S. SHAILER.
GEORGE F. FOLSOM.

Witnesses:
R. H. Eddy,
F. P. Hale, Jr.